United States Patent [19]
Wolf

[11] 3,911,683
[45] Oct. 14, 1975

[54] EFFICIENT AND NONPOLLUTING METHOD FOR RECOVERING GEOTHERMAL HEAT ENERGY

[76] Inventor: John H. Wolf, 1710 22nd St., Lake Charles, La. 70601

[22] Filed: Dec. 12, 1974

[21] Appl. No.: 532,213

[52] U.S. Cl. .................... 60/641; 165/45; 165/105
[51] Int. Cl.[2] ........................................ F03G 7/00
[58] Field of Search ................ 60/641; 165/45, 105

[56] References Cited
UNITED STATES PATENTS

| | | | |
|---|---|---|---|
| 3,472,314 | 10/1969 | Balch | 165/45 X |
| 3,503,025 | 3/1970 | Weinfurt | 165/107 |
| 3,749,163 | 7/1973 | Waters | 165/105 |

Primary Examiner—Martin P. Schwadron
Assistant Examiner—Allen M. Ostrager
Attorney, Agent, or Firm—Rose & Edell

[57] ABSTRACT

Geothermal heat is transferred from either dry or wet sub-terranean strata to a location at or neat the earth's surface by a passive heat pipe extending into a well. The upper end of the heat pipe, to which the latent geothermal heat is transferred, extends into a steam chamber in which water is converted to steam used to drive a turbine generator or the like. After driving the turbine, the steam is condensed to liquid form and redirected into the steam chamber where it is once again converted to steam by the heat pipe. The utilization of a passive heat pipe means that nothing but heat is taken from the earth; hence, there is no land subsidence and no pollution. Further, the passive heat pipe eliminates the need for actively pumping a heat transfer fluid down through a well and back up to the surface.

7 Claims, 3 Drawing Figures

EFFICIENT AND NONPOLLUTING METHOD FOR RECOVERING GEOTHERMAL HEAT ENERGY

BACKGROUND OF THE INVENTION

The present invention relates to the recovery of latent geothermal energy from the earth and, more particularly, to the efficient recovery of geothermal energy without pollution and land subsidence effects.

The rapidly diminishing sources of fossil fuels, combined with the polluting effects of both fossil fuels and nuclear reactors, has resulted in a number of prior art attempts to utilize the intense heat at the earth's interior as a source of energy to drive electric generators. Most of these attempts are limited to the discovery of a particular state of sub-terranean strata; that is, some approaches require a dry strata, others require a wet strata, and still others require a gaseous strata. Some prior art approaches require hydraulic fracturing of rock formations, a procedure which has thus far not proven to be economically feasible. All known prior art approaches to the recovery of geothermal energy require the active pumping of a fluid, either gaseous or liquid, down through a deep well and then back up to the power plant or generating station. The pumped fluid either forces a subterranean fluid back up to the power station or serves as a heat exchange fluid which transfers the geothermal energy to the earth's surface. Active pumping requires a significant amount of energy, thereby reducing the efficiency of the recovery process.

It is therefore an object of the present invention to provide a method for transferring latent geothermal heat from either dry or wet sub-terranean strata to a point at or near the surface of the earth for utilization as a primary power source in the generation of electricity.

It is another object of the present invention to provide a method for recovering geothermal energy without the undesirable side effects of environmental pollution and land subsidence.

It is still another object of the present invention to provide a method of recovering geothermal energy for conversion to electricity without actively pumping a heat exchange fluid down and up a long well.

SUMMARY OF THE INVENTION

In accordance with the present invention a sealed passive heat pipe is inserted into a well, extending to a depth of sub-terranean strata of high geothermal temperatures. The heat pipe, without the aid of an active pumping arrangement, transfers the geothermal heat to a steam chamber at or near the surface of the earth. Water injected into the steam chamber is converted to steam by the hot heat pipe, the steam in turn being applied to drive a steam turbine or other energy conversion device. After driving the turbine the steam is condensed to liquid form and pumped back to the steam chamber where it is once again converted to steam for driving the turbine. The method is characterized by the fact that only heat and not matter is removed from the earth, and by the fact that heat transfer is accomplished without costly and inefficient active pumping apparatus. Therefore, the method is pollution free and results in no land subsidence. Moreover the efficiency of the recovery process is higher than possible in any prior art attempts to recover geothermal energy.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

Figure 1:
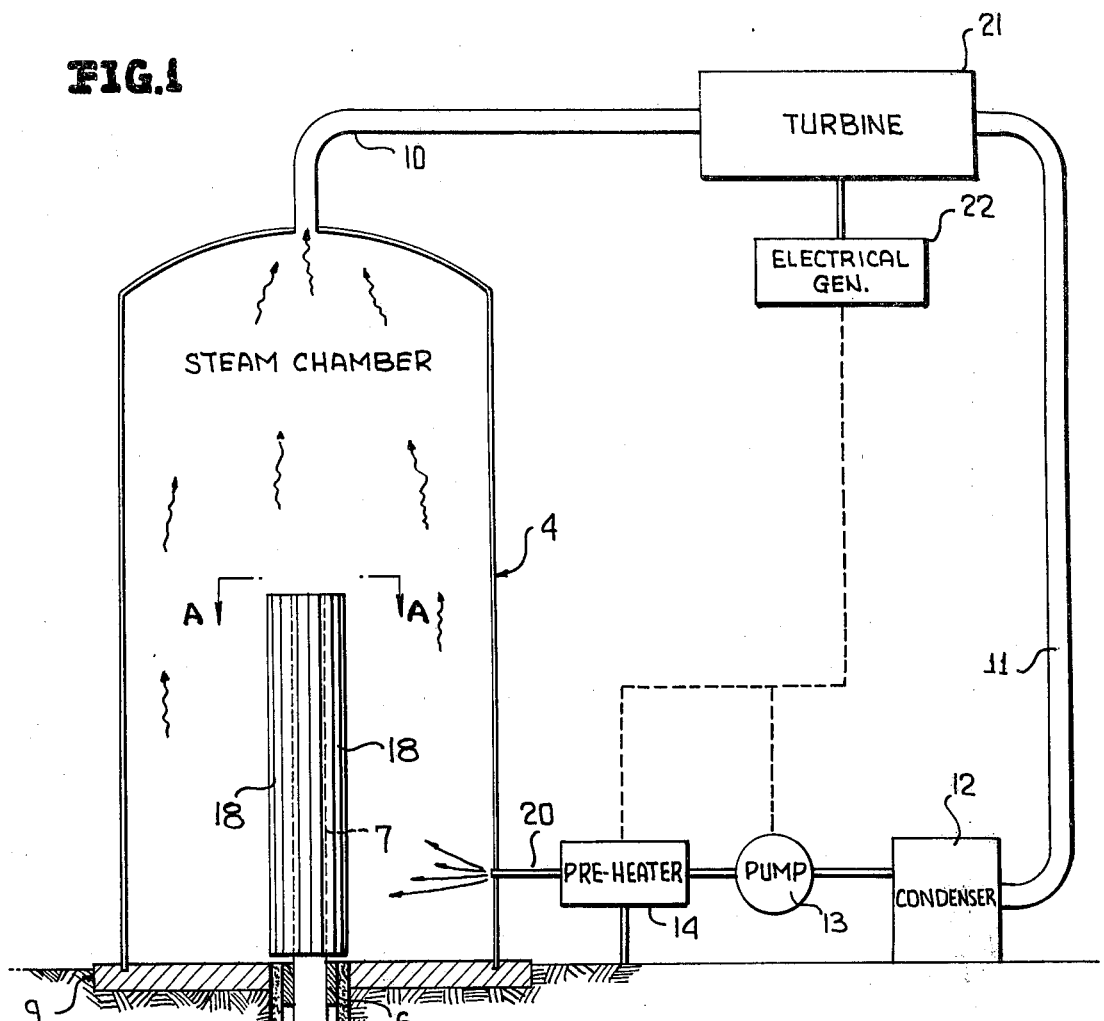
FIG. 1 is a diagrammatic view with parts in section illustrating the method of the present invention.

Referring specifically to FIG. 1 of the accompanying drawings, a sub-terranean bore or well 1 extends from a location at or near the earth's surface to a depth at which the geothermal temperatures are on the order of 240°F or more. The lower extremity of bore hole 1 may terminate in sub-terranean strata which is liquid, solid, powdered, or gaseous, as long as the temperature is at a useful geothermal temperature level. A well casing 2 extends substantially along the entire depth of the bore hole 1 to prevent collapse of the well and define a raceway for a passive heat pipe to be described. The top of bore hole 1 is surrounded by a platform 9, made of concrete or the like, which serves as a foundation for a steam chamber 4 located above the bore hole. An annular concrete seal 3 extends from foundation 9 to a point approximately 100 feet below the surface of the earth. A suitable pressure seal 6, for example made of asbestos packing, is placed between the wall of bore hole 1 and the well casing 2 to prevent leakage and thereby contain the geopressure.

Figure 2:
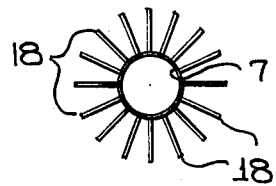
FIG. 2 is a view in section taken along lines AA of FIG. 1.
Figure 3:
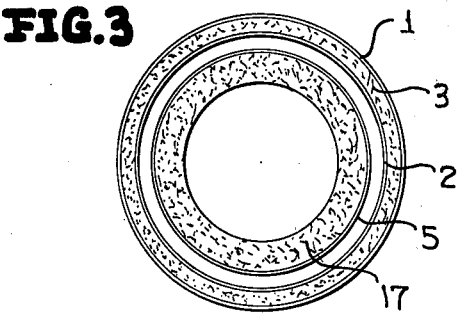
FIG. 3 is a view in section taken along lines BB of FIG. 1.

A tri-section passive heat pipe includes a heat output section 7 extending above the surface on bore hole 1 and into steam chamber 4, a heat input section 8 located at the lower extremity of the heat pipe and positioned at or near the bottom of the bore hole 1, and a transport section 5 interconnecting the heat output section 7 with the heat input section 8 and extending throughout the bore hole 1 from a point at the termination of heat input section 8. Passive heat pipes are well known in the art as described in U.S. Pat. No. 3,769,674. Generally they are constructed of a heat conductive material such as copper in a tubular form, sealed at both ends. A working fluid, which may be liquid metal, oil, parafin, water, etc. is sealed within the tube. A cylindrical wick 17 of annular cross-section extends substantially the entire length of the heat pipe and is best illustrated in FIG. 3 of the accompanying drawings. A plurality of fins 18 (reference FIG. 2) extend radially from the outer wall of heat output section 7 of the heat pipe and in planes which are parallel to the longitudinal axis of the heat pipe. Heat pipes of this type, which heretofore have been utilized in air-conditioning systems, operate in the following manner: the working fluid is in a liquid vapor equilibrium state, the liquid being contained in a wick and the vapor occupying the core of the heat pipe. If the heat input section 8 is brought into thermal contact with a source of heat energy, liquid in the wick is vaporized and the vapor rapidly travels through the transport section 5 to the heat output section 7 where it is condensed and gives up its heat. Because the working fluid is maintained in an equilibrium condition, the liquid is highly volatile, so that the addition of heat at the heat input section 8 causes the volatile liquid to vaporize, expand, and fill the tube whereby to transmit the heat to the cooler sections of the pipe.

Water, or other suitable liquid, is pre-heated at pre-heater unit 14 and supplied to steam chamber 4 via conduit 20. Upon entering the steam chamber the liquid comes into contact with the heat output section 7 of the passive heat pipe and is transformed into steam. The steam thusly generated flows through a steam conduit to a turbine 21 which drives an electrical generator 22. The generator, in turn, powers pre-heater 14 as well as a pump 13 which delivers the liquid to the pre-heater. After driving the turbine 21, the steam, at a significantly lower pressure and temperature, is passed through an exhaust line to a condenser 12 where it is returned to a liquid state. Pump 13 transfers the liquid thus condensed to pre-heater 14 and back to chamber 4 to repeat the cycle. The pre-heater 14 raises the temperature of the pumped liquid to just below the boiling point of the liquid to thereby minimize the energy required in converting the liquid to steam in the steam chamber.

The method as thus described is entirely pollution free, affecting neither the atmosphere nor the surface of the earth. In addition since nothing is removed from the earth there is no land subsidence problem created by the described method. Suitable insulation of the steam chamber 4 and all of the conduits assures minimal if not negligible heat discharge into the atmosphere.

The method of the present invention requires no active pumping of heat exchange fluid or other fluid into the well, the only active pumping in the system being that performed by pump 13 to recirculate the steam through the conversion unit located entirely above the earth's surface. There is no requirement to find a particular type of sub-terranean strata since the passive heat pipe operates to efficiently transfer heat to the earth's surface from any type of sub-terranean environment. Moreover, the utilization of a passive heat pipe, as opposed to an actively-pumped heat transfer fluid, reduces maintenance time and costs from those associated with high pressure pumping systems.

While I have described and illustrated specific embodiments of my invention, it will be clear that variations of the details of construction which are specifically illustrated and described may be resorted to without departing from the true spirit and scope of the invention as defined in the appended claims.

What is claimed is:

1. The method of converting geothermal heat energy to electricity comprising the steps of:

drilling a borehole into the earth to a depth sufficient to reach strata having geothermal temperatures on the order of at least 240°F;

inserting a heat pipe into said borehole, said heat pipe being of a type which conducts heat from one of its ends to the other, the heat pipe being inserted with said one end in said hole and the other end proximate the surface; and converting heat which is conducted to said other end of said heat pipe to another form of energy.

2. The method according to claim 1 wherein said step of converting comprises:

contacting said other end of said heat pipe with liquid in a steam chamber to form steam;

conducting the steam formed in said steam chamber to drive a turbine.

3. The method according to claim 2 further comprising the step of:

pre-heating said liquid before it contacts said other end of said heat pipe.

4. The method according to claim 3 further comprising the step of:

recirculating the steam used to drive said turbine by first condensing the steam after it drives the turbine and then pumping the condensed steam to said steam chamber.

5. Apparatus for recovering geothermal energy through a borehole extending into the earth, said apparatus comprising:

a passive heat pipe disposed in said borehole and capable of transferring heat from one end of the heat pipe disposed proximate the bottom of said borehole to the other end of said heat pipe extending above the top of said borehole;

a steam chamber disposed above said borehole such that said other end of said heat pipe extends into said steam chamber;

liquid supply means for introducing liquid into said chamber to form steam therein upon contacting said other end of said heat pipe;

a steam turbine; and means for conducting the steam formed in said steam chamber to drive said steam turbine.

6. The apparatus according to claim 5 wherein said liquid supply means comprises a pump and a pre-heater for raising the temperature of said liquid before the liquid is introduced into said steam chamber.

7. The apparatus according to claim 6 further comprising:

condenser means for converting steam to liquid;

means for conducting said steam after it drives said turbine to said condenser means; and means for delivering liquid from said condenser means to said pump.

* * * * *